US 8,024,710 B2

(12) United States Patent
Kornstaedt

(10) Patent No.: US 8,024,710 B2
(45) Date of Patent: Sep. 20, 2011

(54) UNWINDING UNWINDABLE CODE

(75) Inventor: Leif Kornstaedt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1180 days.

(21) Appl. No.: 11/796,465

(22) Filed: Apr. 27, 2007

(65) Prior Publication Data
US 2008/0270990 A1 Oct. 30, 2008

(51) Int. Cl.
*G06F 9/44* (2006.01)
(52) U.S. Cl. ......... 717/126; 717/124; 717/128; 717/130
(58) Field of Classification Search .................. 717/126, 717/124, 128, 130
See application file for complete search history.

(56) References Cited

U.S. PATENT DOCUMENTS

| | | | |
|---|---|---|---|
| 5,628,016 A | 5/1997 | Kukol | |
| 6,014,515 A | 1/2000 | Burch | |
| 6,289,446 B1 * | 9/2001 | Nilsson | 712/244 |
| 6,293,712 B1 | 9/2001 | Coutant | |
| 6,470,493 B1 | 10/2002 | Smith et al. | |
| 6,662,358 B1 | 12/2003 | Berry et al. | |
| 6,892,379 B2 | 5/2005 | Huang | |
| 6,988,262 B1 * | 1/2006 | Mallory et al. | 717/127 |
| 6,993,750 B2 | 1/2006 | Hundt et al. | |
| 7,017,153 B2 | 3/2006 | Gouriou et al. | |
| 7,131,115 B2 | 10/2006 | Hundt et al. | |
| 2003/0101380 A1 | 5/2003 | Chaiken et al. | |
| 2003/0115582 A1 * | 6/2003 | Hundt et al. | 717/158 |
| 2003/0135847 A1 * | 7/2003 | Gouriou et al. | 717/158 |
| 2005/0166208 A1 * | 7/2005 | Worley et al. | 719/310 |
| 2006/0059486 A1 * | 3/2006 | Loh et al. | 718/100 |
| 2007/0283352 A1 * | 12/2007 | Degenhardt et al. | 718/100 |
| 2009/0271801 A1 * | 10/2009 | Bratanov et al. | 718/108 |

OTHER PUBLICATIONS

Ogasawara, Takeshi; Komatsu, Hideaki; Nakatani, Toshio; "A Study of Exception Handling and Its Dynamic Optimization of Java" Copyright 2001.*
Guile Reference Manual. Copyright 1996. http://www.gnu.org/software/guile/manual/guile.html.*
Froyd, Nathan; Tallent, Nathan; Mellor-Crummey, John; Fowler, Rob. "Call Path Profiling for Unmodified, Optimized Binaries." Summit 2006.*
Froyd, Nathan; Mellor-Crummey, John; Fowler, Rob. "Low-Overhead Call Path Profiling of Unmodified, Optimized Code." Copyright 2003.*
Drew, et al., "Implementing Zero Overhead Exception Handling", http:sky.fit.qut.edu.au/~gaugh/zeroex.ps. Published 1995.*
Ramasamy, et al., "Dynamic Binary Instrumentation for Intel Itanium Processor Family", Date: Dec. 1-5, 2001, http://h21007.www2.hp.com/dspp/files/unprotected/Itanium/EPIC-DSPP-1.pdf.
Zastre, et al., "Two Techniques for Improving the Performance of Exception Handling", Date: Jul. 25, 2005, http://www.cs.uvic.ca/~nigelh/Publications/exceptions2005.pdf.

* cited by examiner

*Primary Examiner* — Wei Zhen
*Assistant Examiner* — Adam Banes
(74) *Attorney, Agent, or Firm* — Krajec Patent Offices, LLC; Russell S. Krajec

(57) ABSTRACT

Unwinding may take place in an annotated unwinding environment with non-annotated code by placing a context frame between a first annotated function and non-annotated function and an unwind thunk between the non-annotated function and a second annotated function. The unwind thunk may redirect an unwind function to the context frame so that an unwind process may continue across a non-annotated function.

20 Claims, 4 Drawing Sheets

UNWINDING UNWINDABLE CODE

BACKGROUND

Unwinding is a technique in computer science by which a call stack may be traversed, for example, to find a handler that may deal with a specific exception. A call stack may have many functions pushed into the stack, each with a stack frame that may include local variables, parameters, and a return address for a caller function. In many instances, a handler may be defined in a function to handle specific exceptions.

When a handler is not present in one call frame, an unwinder may proceed to the next call frame. In order to unwind, many unwinding mechanisms use information outside of the call stack for unwinding. The information may be referred to as annotations that are generated as part of the compilation process. Such annotated code may be unwound by traversing the call stack using the annotations. Code that is not annotated is generally not unwindable, since the information used to unwind is not available. When a non-annotated stack frame is encountered, an unwinder may not be able to proceed.

SUMMARY

Unwinding may take place in an annotated unwinding environment with non-annotated code by placing a context frame between a first annotated function and non-annotated function and an unwind thunk between the non-annotated function and a second annotated function. The unwind thunk may redirect an unwind function to the context frame so that an unwind process may continue across a non-annotated function.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
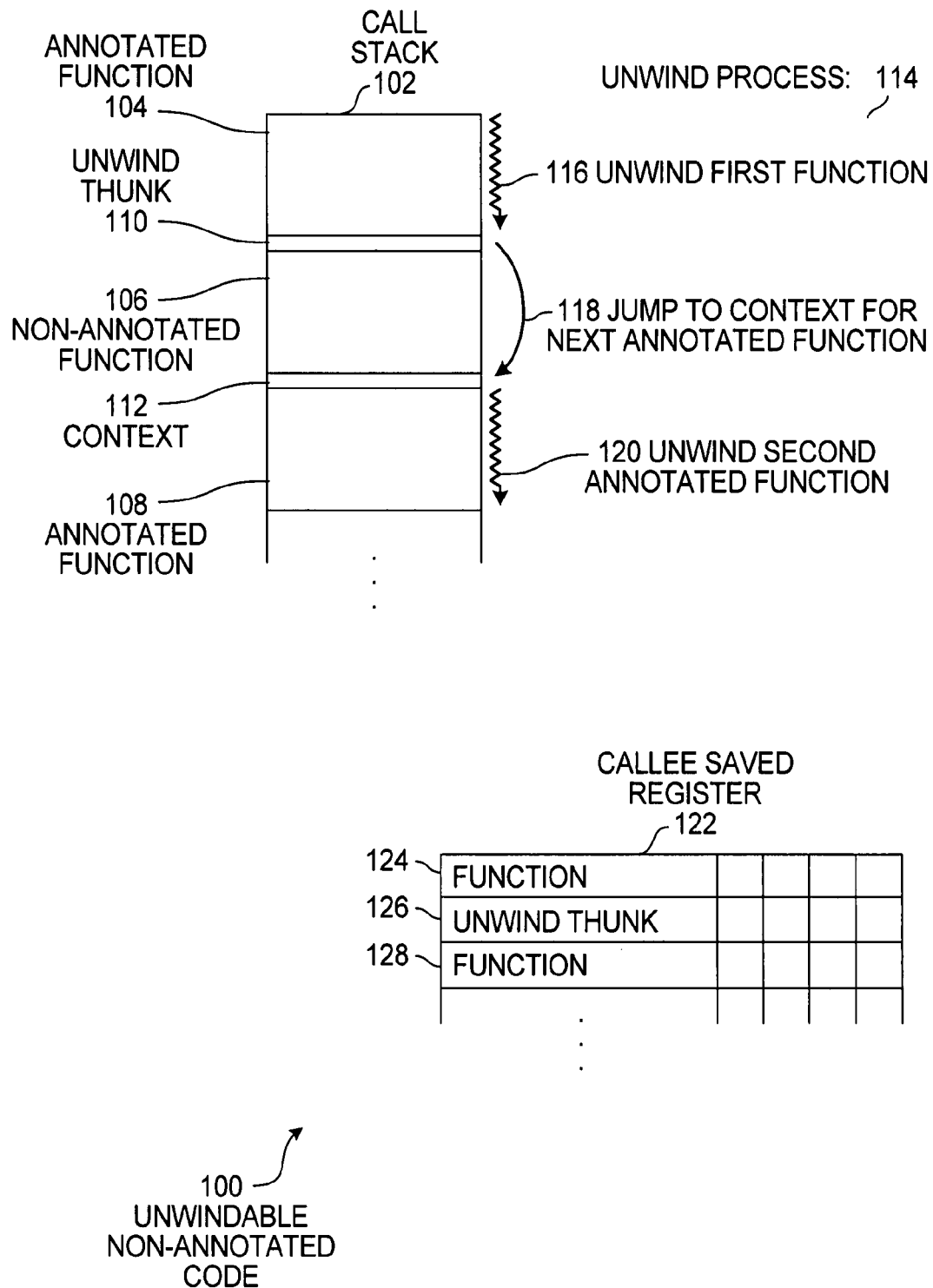
FIG. 1 is a diagram of an embodiment showing an unwindable call stack with annotated and non-annotated code.

Unwinding is a process by which a call stack may be traversed to locate various items. Typically, unwinding is performed during exception handling. After an exception is thrown, the call stack may be traversed in order to find an exception handler for the specific type of exception. When an exception handler is found, execution may continue at the exception handler and stack frames that were traversed to reach the exception handler may be popped off the stack and discarded.

Unwinding may also be performed for other functions, such as virtual unwinding that may be used to traverse a call stack for debugging and other purposes.

Some computer code is capable of unwinding while other code is not. Unwindable code may be called annotated code, in reference to a callee-saved register in which information used by an unwinding process may be stored. Each function that is compiled or run in an annotated mode may place an entry in the callee-saved register. Non-annotated code, or code that is not unwindable, is code that does not update the callee-saved register or is otherwise unable to be unwound. Other annotated code may use different mechanisms for unwinding a code stack.

Unwinding through code that is a combination of annotated and non-annotated may be accomplished by inserting information on either side of non-annotated code so that unwinding may proceed across the non-annotated code. When pushing a non-annotated function onto the call stack above an annotated function, a context may be defined and saved for the annotated function. The context may be inserted between the annotated and non-annotated code.

When pushing an annotated function onto the call stack above a non-annotated function, an unwind thunk may be inserted between the functions on the call stack. The unwind thunk may point to the previously inserted context so that an unwind mechanism may skip the non-annotated code and continue with the last annotated code.

For the purposes of this specification, the term "annotated" shall refer to any set of computer instructions, compiled or uncompiled, that is capable of unwinding within the environment in which the instructions are executed, regardless of the unwind mechanism. Some forms of annotated code may use a callee-saved register while other forms of annotated code may use a caller-saved register, embedded unwind data, or some other mechanism or combination of mechanisms used by an unwinding routine. Any unwind mechanism or combination of unwind mechanisms may be used to unwind annotated code.

The term "non-annotated" shall refer to computer instructions for which an unwinding mechanism cannot properly operate in the environment, even if the code has annotations that may be used in a different environment. Such non-annotated code may be annotated in one environment but be non-annotated in a second environment.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing an unwindable non-annotated code. Non-unwindable code may be unwound by placing information on either side of the non-annotated or non-unwindable code so that an unwinding process may unwind through annotated or unwindable code.

The call stack 102 contains an annotated function 104, a non-annotated function 106, and an annotated function 108. The call stack 102 is oriented such that the newest functions are pushed onto the call stack 102 from the top, which pushes older functions downward.

Between the newest annotated function 104 and the non-annotated code 106 is an unwind thunk 110. The unwind thunk 110 may be recognized by an unwinding process and used to jump to a context 112 that is between the non-annotated code 106 and an older annotated function 108. The context 112 may enable the unwinding process to continue unwinding with the annotated function 108.

In an example of an unwind process 114, the unwind process may traverse the call stack 102 downwards, beginning with unwinding the first function in step 116. When the unwind thunk 110 is encountered, the process jumps 118 to the context 112. The context 112 may enable the unwind process to continue unwinding 120 the second function.

The context 112 and unwind thunk 110 may be used to jump across an unwindable portion of code in a call stack. Such a condition may occur when different code sources are used in a runtime environment. For example, a set of routines that are pre-compiled with annotations may be called by other code that is non-annotated. Similarly, non-annotated code may call functions that are annotated.

The context 112 and unwind thunk 110 may not enable an unwind process to unwind within the non-annotated function 106, but they may enable an unwind process to continue across the non-annotated function 106.

The context 112 may be any data that may be used by an unwinding process to unwind the annotated function 108. The context 112 may be tailored to emulate an epilog of an annotated function call while the unwind thunk 110 may emulate a prolog of an annotated function call. In such a manner, an unwind mechanism may treat the combination of a context 112, a non-annotated function 106, and an unwind thunk 110 as if the combination was an annotated function.

In some embodiments of annotated code, each annotated callee may store information in a callee saved register 122. The register 122 may be constructed in many different manners and contain information that may be used by an unwind mechanism to traverse the call stack properly. In the register 122, each function may have an entry defined by a row. For example, rows 124 and 128 may have an entry for functions 104 and 108, respectively. Row 126 may have an entry for the unwind thunk 110 that may direct the unwind mechanism to proceed to the context 112 and continue unwinding. In some embodiments, a single function may have multiple entries, each of which may contain information useful for an unwinder to locate specific areas within the function.

In some embodiments, the callee saved register may be known as an annotation register or by other terms. The callee saved register 122 may be any array, stored data, or other mechanism that may be used by an unwinder to successfully traverse a call stack.

Some embodiments may or may not use a callee saved register 122 to track function calls. Other embodiments may embed information within the call stack 102 or other memory location for the unwind process. The callee saved register 122 may be created at any time during the application creation and execution process, including at compile time, at link time, and at run time. In some embodiments, the callee saved register 122 may be created and maintained within a program and its various functions. In a typical managed environment such as a virtual machine, the callee saved register may be created at link time.

Figure 2:
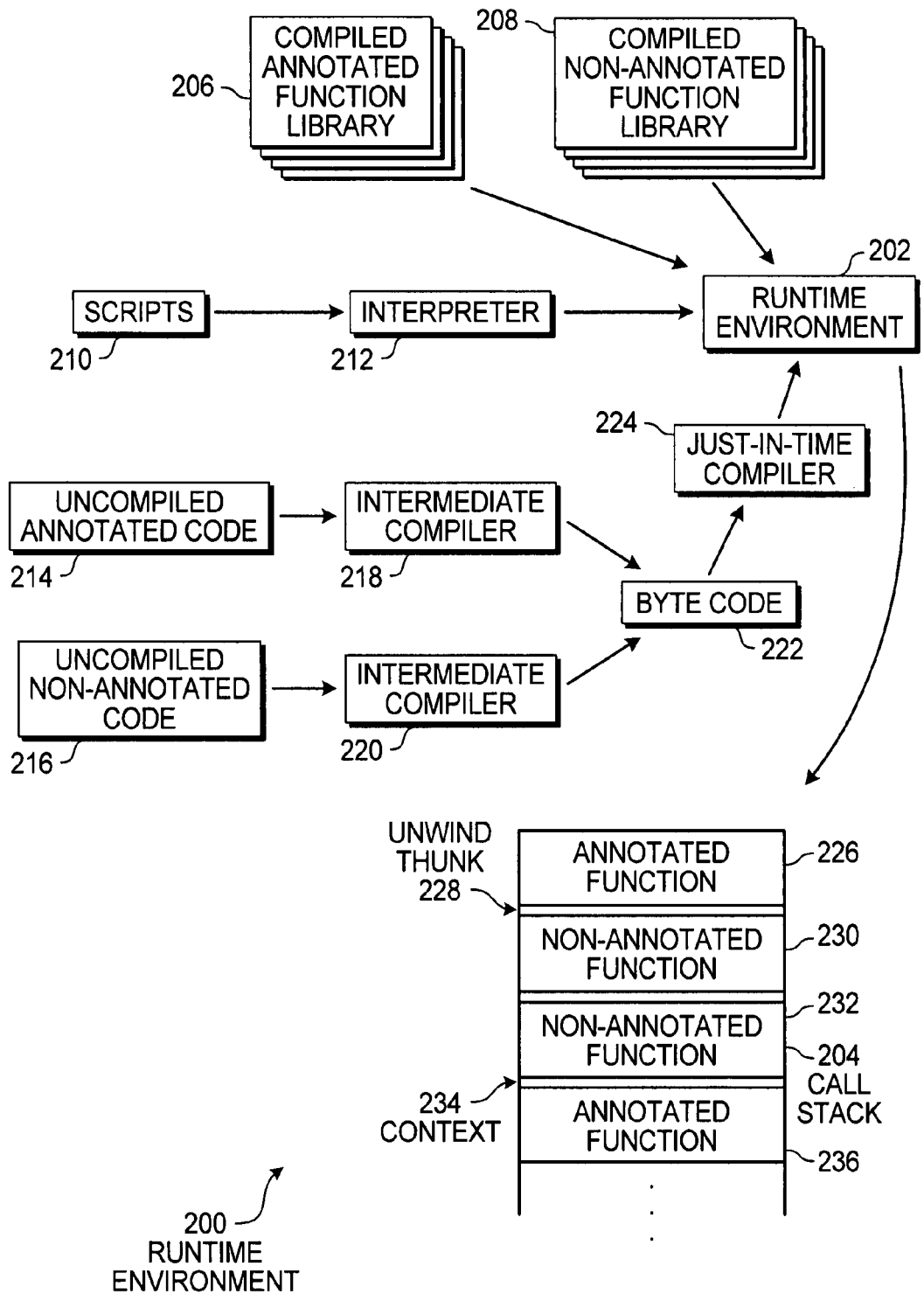
FIG. 2 is a diagram of an embodiment showing a runtime environment for unwinding annotated and non-annotated code.

FIG. 2 is a diagram of an embodiment 200 showing a runtime environment that uses annotated and non-annotated code. Code may come from many different sources and may be defined in different languages, including different compiled languages, scripting interfaces, partially compiled code, or other sources. Within a runtime environment 202, the various code elements may be combined in a manner so that the call stack 204 may be unwound for exception handling or other purposes.

The runtime environment 202 may accept several different sources of computer instructions, including functions from a compiled annotated function library 206, a compiled non-annotated function library 208, scripts 210 that are interpreted by a script interpreter 214. Other functions may come from uncompiled annotated code 214 or uncompiled non-annotated code 216 that are converted into bytecode 222 by intermediate compilers 218 and 220, respectively. Bytecode 222 may be an intermediate language that is compiled by a just in time compiler 224 to generate executable code.

Many different technologies may be used to generate executable code that is operated by a processor or group of processors. In some instances, fully compiled libraries and applications 206 and 208 may be executed on a system. Such applications may be constructed from portions of code that are annotated along with other portions that are non-annotated.

When annotated and non-annotated code are used together, a call stack 204 may be created that has annotated functions 226 and 236 with an unwind thunk 228, one or more non-annotated functions 230 and 232, and a context 234. The unwind thunk 228 and context 234 may be used by an unwind mechanism to unwind through the call stack 202.

The unwind thunk 228 and context 234 may be defined and added to the call stack 202 at runtime by a runtime environment 202. Examples of a runtime environment may include an operating system environment as well as a virtual machine or other virtualized environment for executing a function or application. In such a runtime environment, when a non-annotated function 232 is called after an annotated function 236, a context 234 may be created and inserted into the call stack 202. In some cases, several non-annotated functions 232 and 230 may be called in succession. When an annotated function 226 is called after a non-annotated function 230, an unwind thunk 228 is created and inserted in the call stack 204 to direct an unwind mechanism to the context 234 that was previously loaded in the stack.

In some embodiments, non-annotated and annotated code may be combined during a compile stage. For example, a function from a library of non-annotated code may be called from another function that is written in an annotated language. During compilation, the functions of a context 234 and unwind thunk 228 may be added to the executable code. In some instances, the non-annotated code may be encapsulated by a function that performs the functions of the context 234 and unwind thunk 228, while in other instances, the functions of the context 234 and unwind thunk 228 may be added to the annotated portions of the executable.

The call stack 204 is illustrated with two non-annotated functions 230 and 232 that are bounded by the unwind thunk 228 and the context 234. In some cases, multiple non-annotated functions may be placed between the unwind thunk 228 and the context 234. In other cases, each non-annotated function 230 and 232 may be bordered by an unwind thunk and a context. In such a case, each non-annotated function may be added to the call stack 202 after a context is inserted, and an unwind thunk may be added to the call stack after the non-annotated function. When multiple non-annotated functions are in a stack, a context and unwind thunk may be present, even between two consecutive non-annotated functions.

Figure 3:
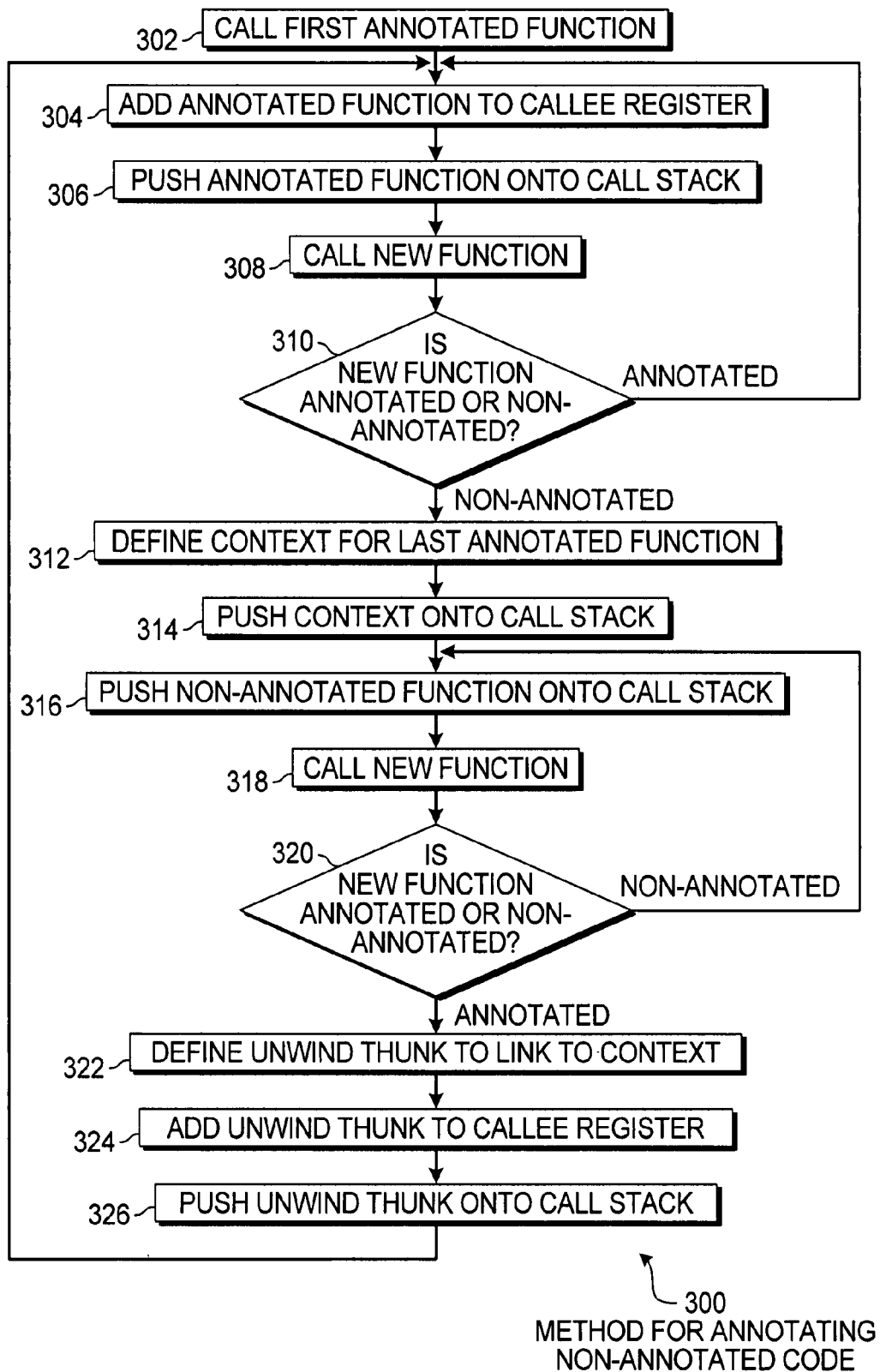
FIG. 3 is a flowchart illustration of an embodiment showing a method for creating unwindable annotated and non-annotated code.

FIG. 3 is a flowchart diagram of embodiment 300 showing a method for annotating non-annotated code. Embodiment 300 illustrates a method by which a call stack may be created that has context information and unwind thunks so that an unwind process may properly traverse the call stack even with the presence of non-annotated code.

Embodiment 300 illustrates a logical flow of calling various annotated and non-annotated functions and loading the functions in a call stack, but is not intended to define the programmatic sequence for handling functions within a call stack. For example, embodiment 300 does not illustrate removing or popping functions from the stack, unwinding, or other such operations.

The first annotated function is called in block 302. The annotated function is added to the callee register in block 304 and pushed onto the call stack in block 306. When a new function is called in block 308, if the new function is annotated in block 310, the process continues in block 304.

If the new function is non-annotated, a context is defined for the last annotated function in block 312 and the context is pushed on the call stack in block 314 along with the non-annotated function in block 316. When a new function is called in block 318 that is a non-annotated function in block 322, the process continues in block 316. If the new function is annotated in block 320, an unwind thunk is defined in block 322 to link to the context added in block 314. The unwind thunk is added to the callee register in block 324 and pushed onto the call stack in block 326. The process returns to block 304.

Embodiment 300 is one method by which one or more non-annotated functions may be encapsulated by a context and unwind thunk so that an unwind mechanism may successfully traverse a call stack across a non-annotated function. The context and unwind thunks may be added at the beginning and end of a group of one or more contiguous non-annotated functions. In other embodiments, each non-annotated function or other non-annotated stack frame may be encapsulated by a context and unwind thunk.

Some embodiments, such as embodiment 300, may use a callee register for storing unwind and other information about annotated functions that are added to the call stack. Other embodiments may use different mechanisms for storing such information, including storing such information in the call stack or another memory location.

Figure 4:
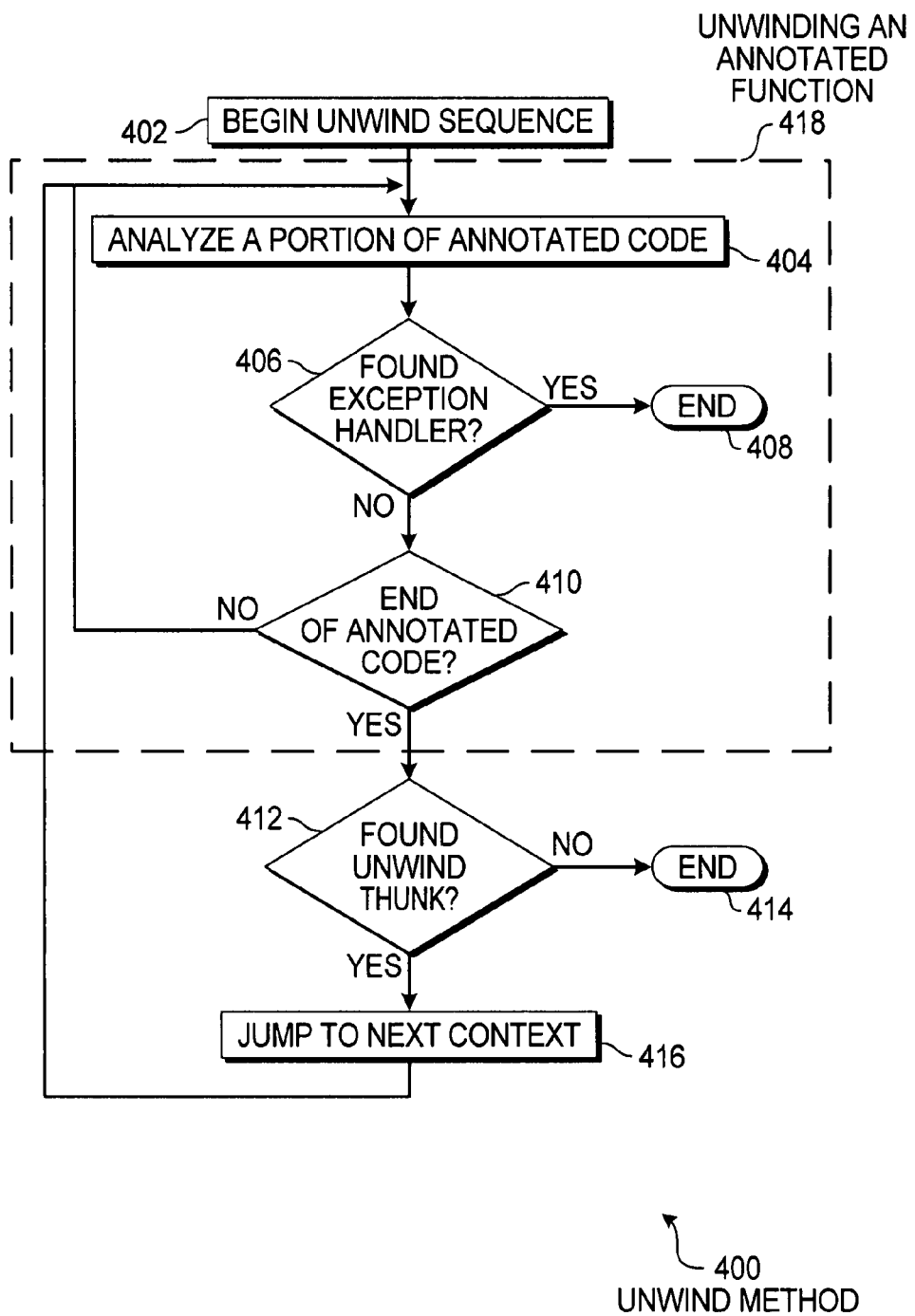
FIG. 4 is a flowchart illustration of an embodiment showing a method for unwinding annotated and non-annotated code.

FIG. 4 is a flowchart illustration showing an embodiment 400 of a method for unwinding. Embodiment 400 illustrates the general flow of an unwind mechanism that is unwinding a call stack to find an exception handler. When an unwind mechanism is unwinding a call stack to find something, such as an exception handler for a specific exception, the unwind mechanism will exit from the embodiment 400 at that point.

Other embodiments may perform an unwind process for other reasons, such as to determine values for a debugging operation, or other purposes. For the purposes of example and not limitation, embodiment 400 illustrates unwinding a stack for exception handling.

The unwind sequence begins in block 402. A portion of non-annotated code is analyzed in block 404. If the exception handler is found in block 406, the unwind process ends in block 408 and the exception handler may be executed.

If the exception handler is not found in block 406, and it is not the end of the annotated code in block 410, the process returns to block 404 to analyze more annotated code.

If the end of the annotated code is reached in block 410 and no unwind thunk is found in block 412, the unwind process terminates in block 414. If an unwind thunk is found in block 412, the process jumps to the next context in block 416 and proceeds to block 404 to analyze more annotated code.

Embodiment 400 is one method by which an unwind mechanism may traverse a call stack in search of something, such as an exception handler. In some unwind mechanisms, a callee register may be used to direct an unwind mechanism to the appropriate locations within a call stack for the next area to analyze. In some such mechanisms, an unwind thunk may have an entry in the callee register that may be used by an unwind mechanism to continue with a previously stored context.

The unwind thunk and context may be placed in the callee saved register or other annotation register so that the combination of unwind thunk and context may appear like an annotated function for the purposes of unwinding. The context may enable an unwinding process to recognize the next annotated function as an unwindable function, which the unwinding process may unwind.

When the unwind thunk is encountered in block 412, the unwinding mechanism may recognize the unwind thunk as a portion of annotated code, rather than as a special unwind thunk. By behaving like annotated code, the unwind thunk may be used by a normal unwinding mechanism adapted to annotated code. In other embodiments, an unwinding mechanism may recognize an unwind thunk as a special type of code, rather than as a portion of annotated code.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
   pushing a first annotated function onto a call stack;
   saving a first context for said first annotated function thereby establishing a first boundary of a non-annotated function;
   pushing the non-annotated function onto said call stack;
   pushing an unwind thunk onto said call stack thereby establishing a second boundary of said non-annotated function;
   pushing a second annotated function onto said call stack; and
   unwinding said call stack by a method comprising:
      unwinding said second annotated function;
      detecting said unwind thunk;
      jumping to said first context such that unwinding skips said non-annotated function between said first boundary and said second boundary; and
      unwinding said first annotated function.

2. The method of claim 1 further comprising: identifying an exception in said call stack; and unwinding said call stack to find a handler for said exception.

3. The method of claim 1, said first annotated function and said second annotated function each having entries in a table of callee-saved registers.

4. The method of claim 1, said first context being stored in a call frame.

5. The method of claim 1, said non-annotated function being defined in a scripting language.

6. The method of claim 1, said non-annotated function being compiled at runtime.

7. The method of claim 1 being performed in a virtual machine environment.

8. A computer readable medium, not comprising transitory signals, comprising computer executable instructions adapted to perform the method of claim 1.

9. A system comprising:
   a first annotated function;
   a second annotated function;
   a non-annotated function;
   a runtime system including a processor and adapted to:
      call said first annotated function;
      save a context for said first annotated function thereby establishing a first boundary of said non-annotated function;
      call said non-annotated function;
      save an unwind thunk thereby establishing a second boundary of said non-annotated function, said unwind thunk comprising a pointer to said first context; and
      call said second annotated function;
   said runtime system further adapted to perform an unwind method comprising:
      unwinding said second annotated function;
      detecting said unwind thunk;
      jumping to said first context via said pointer thereby skipping unwinding of said non-annotated function between said first boundary and said second boundary; and
      unwinding said first annotated function.

10. The system of claim 9, said unwind method being performed in response to an exception.

11. The system of claim 9, said first annotated function and said second annotated function each having entries in a table of callee-saved registers.

12. The system of claim 9, said first context being stored in a call frame.

13. The system of claim 9, said first non-annotated function being defined in a scripting language.

14. The system of claim 9, said non-annotated function being compiled at runtime.

15. The system of claim 9 being performed in a virtual machine environment.

16. A method comprising:
   inserting a context frame between a first annotated function in a call stack and at least one non-annotated function thereby forming a first boundary of said at least one non-annotated function;
   inserting an unwind thunk between said at least one non-annotated function and a second annotated function in said call stack thereby forming a second boundary of said at least one non-annotated function;
   unwinding said call stack by a process comprising:
      unwinding said second annotated function;
      detecting said unwind thunk; and
      jumping to said context frame such that unwinding skips said at least one non-annotated function between said first boundary and said second boundary.

17. The method of claim 16, said unwind thunk being annotated.

18. The method of claim 16, said first annotated function and said second annotated function each having entries in a table of callee-saved registers.

19. The method of claim 16, said unwinding being performed in response to an exception.

20. A computer readable medium, not comprising transitory signals, comprising computer executable instructions adapted to perform the method of claim 16.

* * * * *